(12) United States Patent
Henson et al.

(10) Patent No.: US 7,140,257 B2
(45) Date of Patent: Nov. 28, 2006

(54) WIRELESS TRANSMITTING PRESSURE MEASUREMENT DEVICE

(75) Inventors: John W. Henson, Orange, CT (US); Daniel G. Horne, Bethlehem, CT (US); Donald D. McIntosh, Milford, CT (US); Walter J. Ferguson, Waterbury, CT (US); John H. Bailey, Shelton, CT (US); Philip E. Butler, Blue Jay, CA (US); Douglas H. Beyer, Redlands, CA (US)

(73) Assignee: Ashcroft Inc., Stratford, CT (US)

( * ) Notice: Subject to any disclaimer, the term of this patent is extended or adjusted under 35 U.S.C. 154(b) by 88 days.

(21) Appl. No.: 10/723,330

(22) Filed: Nov. 26, 2003

(65) Prior Publication Data

US 2004/0113813 A1 Jun. 17, 2004

Related U.S. Application Data

(60) Provisional application No. 60/444,314, filed on Jan. 31, 2003, provisional application No. 60/432,416, filed on Dec. 10, 2002.

(51) Int. Cl.
*G01L 9/10* (2006.01)

(52) U.S. Cl. .............................. 73/735; 73/732; 73/753

(58) Field of Classification Search ........... 73/700–756
See application file for complete search history.

(56) References Cited

U.S. PATENT DOCUMENTS

| | | |
|---|---|---|
| 1,879,276 A | 9/1932 | Isaac |
| 1,953,914 A | 4/1934 | Camilli |
| 2,117,287 A | 5/1938 | Bloch |
| 2,372,582 A | 3/1945 | Kean |
| 3,283,581 A | 11/1966 | Du Bois et al. |
| 3,459,043 A | 8/1969 | Young |
| 3,581,566 A | 6/1971 | Goff et al. |
| 3,615,719 A | 10/1971 | Michel et al. |
| 3,742,233 A | 6/1973 | Gorgens et al. |
| 3,865,557 A | 2/1975 | Andres et al. |
| 3,878,721 A | 4/1975 | Nash |
| 3,936,734 A | 2/1976 | Brandli et al. |
| 3,973,191 A | 8/1976 | Zabler |
| 3,975,706 A | 8/1976 | Kato |
| 4,055,085 A | 10/1977 | Wetterhorn |
| 4,075,551 A | 2/1978 | Zabler |
| 4,099,414 A | 7/1978 | Krahmer |
| 4,184,377 A * | 1/1980 | Hubbard ...................... 73/733 |
| 4,237,445 A | 12/1980 | Crossman |
| 4,396,301 A | 8/1983 | Stucki |
| 4,460,869 A | 7/1984 | Buser et al. |

(Continued)

FOREIGN PATENT DOCUMENTS

DE 2341988 A 7/1974

(Continued)

OTHER PUBLICATIONS

Accutech, Wireless Instrumentation, Pressure Field Unit, 2 pages, 2003.

(Continued)

*Primary Examiner*—Edward Lefkowitz
*Assistant Examiner*—Jermaine Jenkins
(74) *Attorney, Agent, or Firm*—Fish & Richardson P.C.

(57) ABSTRACT

A pressure measurement device includes a housing having an inlet, a transducer coupled to the inlet to generate an electrical signal representative of pressure at the inlet, and a data communication device coupled to the transducer to transmit a wireless signal corresponding to the electrical signal.

59 Claims, 7 Drawing Sheets

U.S. PATENT DOCUMENTS

| | | | |
|---|---|---|---|
| 4,502,334 A | 3/1985 | Gorgens et al. | |
| 4,598,260 A | 7/1986 | Carr | |
| 4,643,586 A | 2/1987 | Hansen | |
| 4,671,116 A | 6/1987 | Glennon et al. | |
| 4,745,811 A * | 5/1988 | Gray | 73/708 |
| 4,833,919 A | 5/1989 | Saito et al. | |
| 5,022,425 A | 6/1991 | Prescott et al. | |
| 5,243,860 A | 9/1993 | Habart | |
| 5,255,981 A | 10/1993 | Schiessle et al. | |
| 5,257,639 A | 11/1993 | Prescott et al. | |
| 5,322,119 A | 6/1994 | Kadwell et al. | |
| 5,521,494 A | 5/1996 | Hore et al. | |
| 5,742,161 A | 4/1998 | Karte | |
| 5,806,761 A | 9/1998 | Enoki et al. | |
| 5,829,148 A | 11/1998 | Eaton | |
| 5,944,179 A | 8/1999 | Walker | |
| 5,973,267 A | 10/1999 | Huang | |
| 5,994,895 A | 11/1999 | Bolte et al. | |
| 6,051,293 A | 4/2000 | Weilandt | |
| H1854 H | 7/2000 | Boston et al. | |
| 6,114,849 A | 9/2000 | Price et al. | |
| 6,119,525 A | 9/2000 | Hamma | |
| 6,164,138 A * | 12/2000 | Blake et al. | 73/732 |
| 6,216,541 B1 * | 4/2001 | Carpenter | 73/741 |
| 6,295,876 B1 * | 10/2001 | Busch | 73/740 |
| 6,369,715 B1 | 4/2002 | Bennett, Jr. et al. | |
| 6,384,596 B1 | 5/2002 | Beyer | |
| 6,422,746 B1 | 7/2002 | Weiss et al. | |
| 6,523,427 B1 | 2/2003 | Ferguson | |
| 6,530,281 B1 * | 3/2003 | Chou | 73/733 |
| 6,604,057 B1 | 8/2003 | Eden et al. | |
| 6,636,793 B1 * | 10/2003 | Garber et al. | 701/45 |
| 6,637,272 B1 * | 10/2003 | Bariere | 73/715 |
| 6,742,396 B1 * | 6/2004 | Schenk, Jr. | 73/735 |
| 6,812,693 B1 | 11/2004 | Heinrich et al. | |
| 2001/0045892 A1 | 11/2001 | Thomas et al. | |
| 2002/0079726 A1 * | 6/2002 | Garber et al. | 297/284.6 |
| 2003/0020466 A1 | 1/2003 | Lewis | |
| 2004/0119459 A1 | 6/2004 | Takashi | |
| 2004/0129095 A1 | 7/2004 | Churchill et al. | |
| 2005/0093537 A1 | 5/2005 | Townsend et al. | |
| 2005/0104578 A1 | 5/2005 | Weber | |

FOREIGN PATENT DOCUMENTS

| | | |
|---|---|---|
| DE | 2739054 A | 3/1979 |
| FR | 2.192.704 | 2/1974 |
| FR | 2.284.869 | 4/1976 |
| GB | 1310030 | 3/1973 |
| GB | 1451899 | 10/1976 |
| GB | 2220270 A | 1/1990 |
| GB | 2 345 546 | 7/2000 |
| JP | 60093325 A | 5/1985 |
| JP | 60138430 A | 7/1985 |
| JP | 02025721 A | 1/1990 |
| JP | 04015191 | 1/1992 |
| JP | 2000162913 A | 6/2000 |
| SU | 494623 A | 3/1976 |
| WO | WO 2004/053450 A1 | 6/2004 |

OTHER PUBLICATIONS

Accutech, Wireless Instrumentation, Base Radio, 2 pages, 2003.

Innovative Sensor Solutions, LTD., DataStik Wireless Tank Gauging, Proven Magnetostrictive Level Sensing Performance: Now Wireless and Battery-Powered, 2 pages, International Search Report for PCT/US03/38041, mailing date May 13, 2004, 7 pages.

PCT International Search Report, PCT/US2004/004543, Jul. 2004, pp. 1-4.

EPO, Patent Abstracts of Japan, Electromagnetic Induction Type Position Detector, vol. 2000, No. 26, Jul. 1, 2002, JP 2001 255107 A (Mitsutoyo Corp), Sep. 21, 2001 Abstract, pp. 1.

PCT International Search Report, PCT/US2004/004484, Jul. 2004, pp. 1-4.

\* cited by examiner

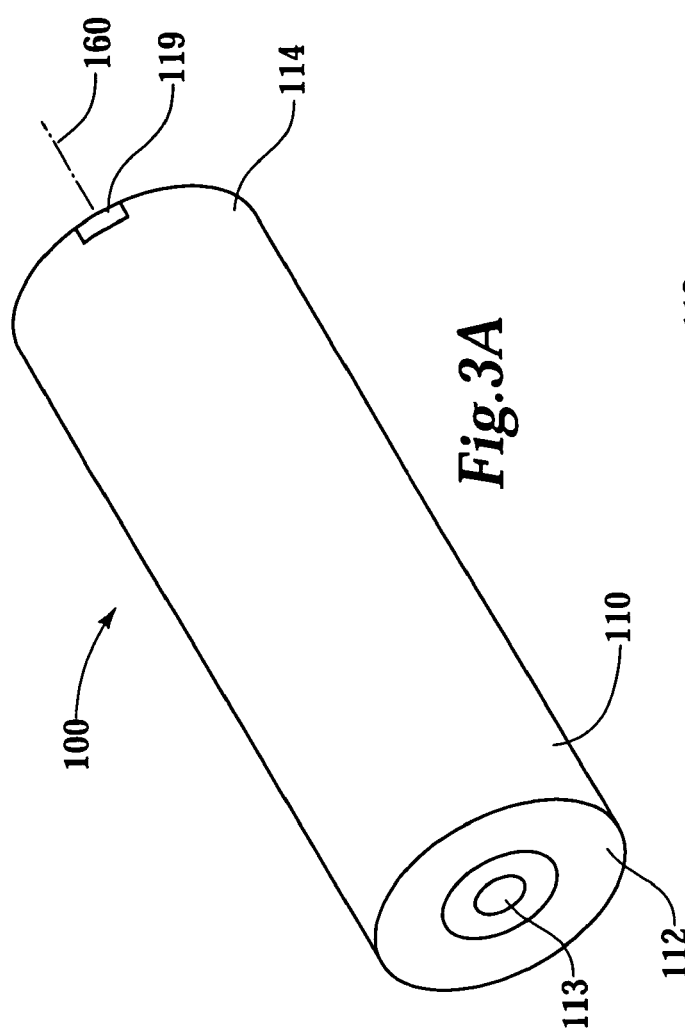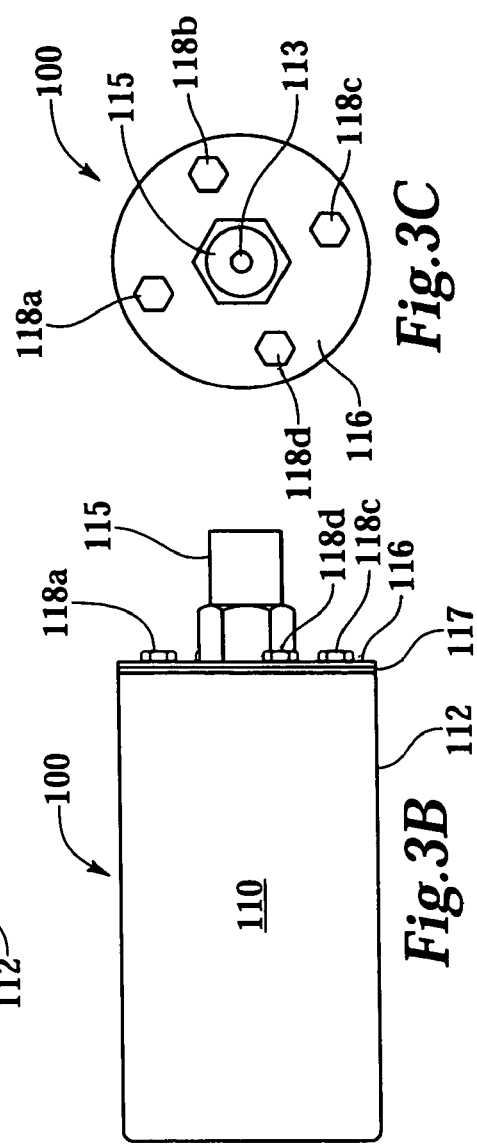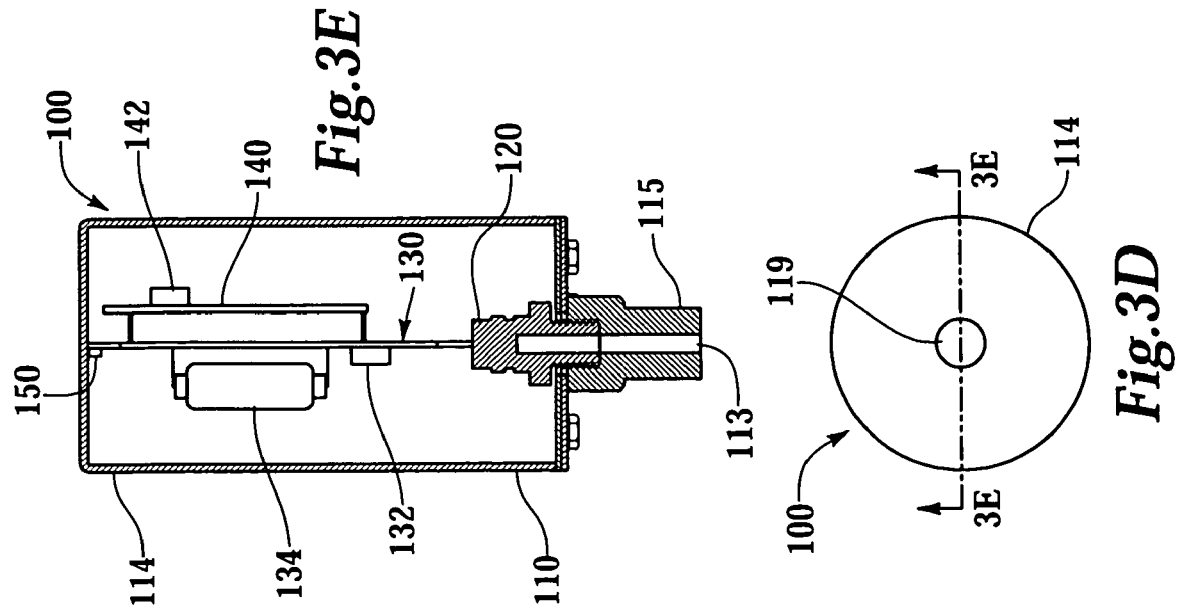

WIRELESS TRANSMITTING PRESSURE MEASUREMENT DEVICE

RELATED APPLICATIONS

This application claims the benefit of U.S. Provisional Application No. 60/432,416, entitled "Wireless Transmitting Pressure Gauge" and filed on Dec. 10, 2002, and U.S. Provisional Application No. 60/444,314, entitled "Wireless Transmitting Pressure Gauge" and filed on Jan. 31, 2003.

TECHNICAL FIELD

The following description relates generally to pressure measurement devices, and, more particularly, to providing information from pressure measurement devices.

BACKGROUND

Pressure gauges are widely utilized in a myriad of different environments for commercial and industrial applications. Typically, pressure gauges measure pressure and provide an indication of the value. Pressure values are usually displayed in analog form (e.g., by a pointer) or in digital form (e.g., by an LED readout). Gauges displaying values in analog form often include a mechanical pressure transducer, such as a Bourdon tube, that displaces a predictable amount in response to the pressure to which the transducer is exposed. The displacement is translated via a movement to a rotatable pointer that moves opposite a dial of calibrated pressure values. Gauges displaying values in digital form often use an electronic pressure transducer, such as a piezosensor, that generates an electrical signal in response to the pressure to which the transducer is exposed. The electrical signal is then converted to a symbol that is presented on a display.

SUMMARY

In one general aspect, a device for measuring pressure includes a housing, a transducer, and a data communication device. The housing has an inlet, and the transducer is coupled to the inlet in the housing to generate an electrical signal representative of pressure at the inlet. The transducer may, for example, be a piezo-type sensor operable to generate an electrical signal in response to pressure at the inlet. The data communication device is coupled to the transducer in the housing to transmit a wireless signal corresponding to the electrical signal, whereby pressure information is provided remotely. The data communication device may, for example, be an infrared emitter.

In some implementations, the device includes a visual indicator coupled to the inlet in the housing to indicate pressure at the inlet. Thus, the pressure information may be provided both locally and remotely. The visual indicator may, for instance, be a digital display.

In particular implementations, the housing includes a stem extending to the inlet, and the transducer includes a Bourdon tube coupled to the inlet to arcuately displace in response to pressure at the inlet. The device also includes a visual indicator having a shaft coupled to the Bourdon tube to rotate in response to displacement of the Bourdon tube, and a pointer attached to the rotatable shaft to indicate pressure values.

In certain implementations, the transducer includes an inductive target coupled to a Bourdon tube, the target being movable in response to displacement of the Bourdon tube, and an eddy current sensor positioned to sense movement of the inductive target and, in response to movement of the inductive target, to generate an electrical signal representative of pressure at an inlet.

In some implementations, the pressure measurement device includes a processor coupled between the transducer and the transceiver. The processor may have a variety of operations. For example, the processor may generate pressure characterization data based on the signal representing pressure at an inlet. The characterization data may be transmitted as part of a wireless signal and may include warnings based on the pressure at the inlet. As another example, the processor may control the frequency at which pressure information is transmitted. The processor may control the pressure information transmission frequency based on pressure data set points, the frequency being altered in response to the pressure crossing a pressure data set point. As a further example, the processor may place itself and other electronic components into a power conservation mode. As an additional example, the processor may compensate for non-linearity of the sensed pressure and/or for temperature coefficients.

Particular implementations may include an Infrared Data Association interface coupled to the processor, wherein the processor may be remotely programmed via the interface. For example, the processor may be programmed to change pressure data set points.

Some implementations may include externally accessible terminals coupled to the processor. The processor may be operable to accept a discrete status input via the terminals. Furthermore, the processor may be operable to output pulse accumulation information via the terminals.

In certain implementations, the pressure measurement device includes a visual indicator at the housing to indicate mode of operation. A pressure measurement device may also include a transceiver on-off switch.

In another general aspect, a method performed at a pressure measurement device includes sensing pressure at an inlet of a housing and converting the sensed pressure to a visual indication of pressure at the housing. The method also includes converting the sensed pressure to an electrical signal at the housing and sending a wireless signal corresponding to the electrical signal from the housing, whereby pressure information is provided both locally and remotely.

In certain implementations, converting the sensed pressure to a visual indication of pressure may include converting the sensed pressure to a mechanical displacement and translating the mechanical displacement to a pointer. Furthermore, converting the sensed pressure to an electrical signal may include translating the mechanical displacement to an inductive target and sensing eddy currents generated in response to displacement of the target. Additionally, sending a wireless signal may include emitting infrared radiation pulses.

Particular implementations may include additional operations. For example, some implementations may include generating characterization data for the sensed pressure based on the electrical signal and sending the characterization data as part of the wireless signal. As another example, certain implementations may include controlling the frequency at which pressure information is sent. As a further example, particular implementations may include placing electronic components into a power conservation mode. As an additional example, some implementations may include receiving wireless signals that specify operational adjustments and adjusting pressure measurement device operations. As another example, certain implementations may include receiving externally generated data and sending the data as part of the wireless signal. As a further example, particular implementations may include providing a visual indication of operating mode at the housing.

In another general aspect, a device for measuring pressure includes a housing, a Bourdon tube, a shaft, and a pointer. The housing has a stem with an inlet, and the Bourdon tube is coupled to the inlet to arcuately displace in response to pressure at the inlet. The shaft is mechanically coupled to the Bourdon tube to rotate in response to displacement of the Bourdon tube, and the pointer is attached to the shaft to indicate pressure values. The device also includes an inductive target coupled to the Bourdon tube, the target being movable in response to displacement of the Bourdon tube, and an eddy current sensor positioned to sense movement of the inductive target and, in response to movement of the inductive target, to generate an electrical signal. The device further includes an analog-to-digital converter coupled to the sensor. The converter is operable to receive the electrical signal and produce a digitized version of the signal. The device also includes a microprocessor coupled to the converter. The microprocessor is operable to receive the digitized signal, compensate for non-linearity of the sensed pressure, compensate for temperature coefficients, and generate pressure characterization data based on the compensated signal. The microprocessor is also operable to determine whether the frequency at which pressure information is transmitted should be adjusted and, if the frequency should be adjusted, adjust the frequency. The microprocessor is further operable to determine whether it is time to transmit pressure information, generate a signal including pressure information if it is time to transmit pressure information, and place itself and other electronic devices into a power conservation mode. The device additionally includes an Infrared Data Association interface coupled to the microprocessor, such that the microprocessor may be remotely programmed via the interface, and an infrared transceiver coupled to the microprocessor to transmit a wireless signal representative of the microprocessor signal, whereby pressure information is provided both locally and remotely.

Details of one or more implementations are set forth in the accompanying drawings and the description below. Other features may be apparent from the description and drawings, and from the claims.

BRIEF DESCRIPTION OF THE DRAWINGS

FIGS. 3A–E show another example pressure measurement device.

DETAILED DESCRIPTION

Figure 1:
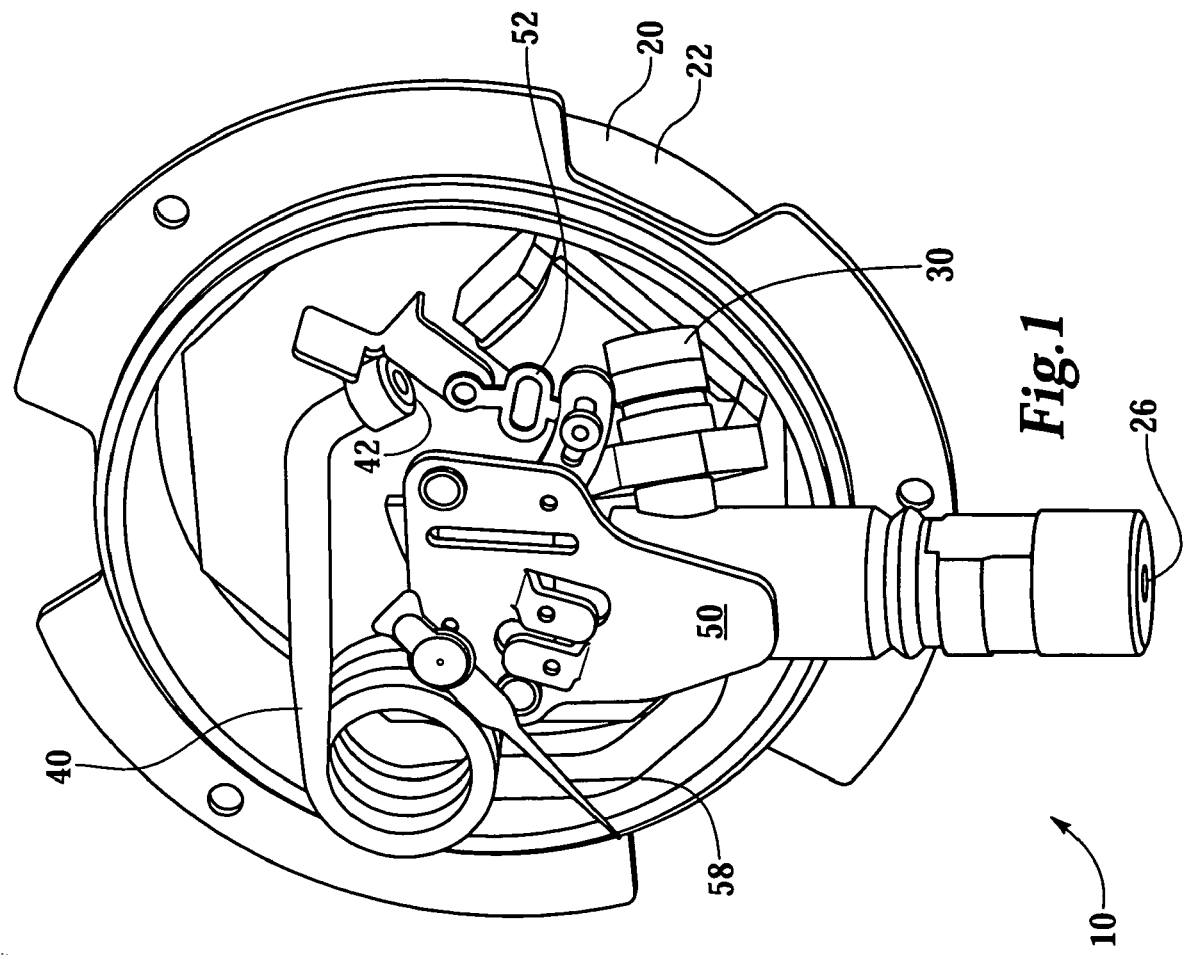
FIG. 1 shows a perspective view of an example pressure measurement device.

FIG. 1 illustrates an example pressure measurement device 10. As illustrated, pressure measurement device 10 is a pressure gauge; other types of pressure measurement devices, however, may be used. Device 10 includes a housing 20 having a rear cover 22 and a front cover, which is not shown to assist in illustrating the internal components of the device. A dial face including pressure values is also not shown to assist in illustrating the internal components of the device.

In device 10, a pressure sensor 30 is in fluid communication with an inlet 26 of housing 20. Pressure sensor 30 is responsive to pressure at inlet 26 to generate an electrical output representative of the pressure at inlet 26. Pressure sensor 30 may be a piezo-type pressure sensor, a capacitive-type pressure sensor, a strain-gauge-type pressure sensor, or any other appropriate pressure-to-electrical transducer. The electrical signal output by sensor 30 may represent the pressure by voltage, current, frequency, pulse width, or any other appropriate electrical signal characteristic. Device 10 also includes a second transducer—a Bourdon tube 40. Bourdon tube 40, however, generates an output different from the output of pressure sensor 30.

In response to the pressure at inlet 26, a tip 42 of Bourdon tube 40 displaces arcuately. By displacing, tip 42 actuates a link 52 of a movement 50. Movement 50 also includes an amplifier to amplify the displacement motion of link 52. Movement 50 mechanically couples displacement of tip 42 to rotation of a pointer 58, a type of indicator. Pointer 58, therefore, rotates in response to pressure changes at inlet 26. When device 10 is fully assembled, pointer 58 may have a pressure-demarcated dial face opposite.

As discussed, device 10 has two transducers, one converting pressure to an electrical signal, and one converting pressure to mechanical movement. In other implementations, a pressure measurement device may have any number of transducers. Moreover, in some implementations, a transducer may provide multiple outputs.

Figure 2:
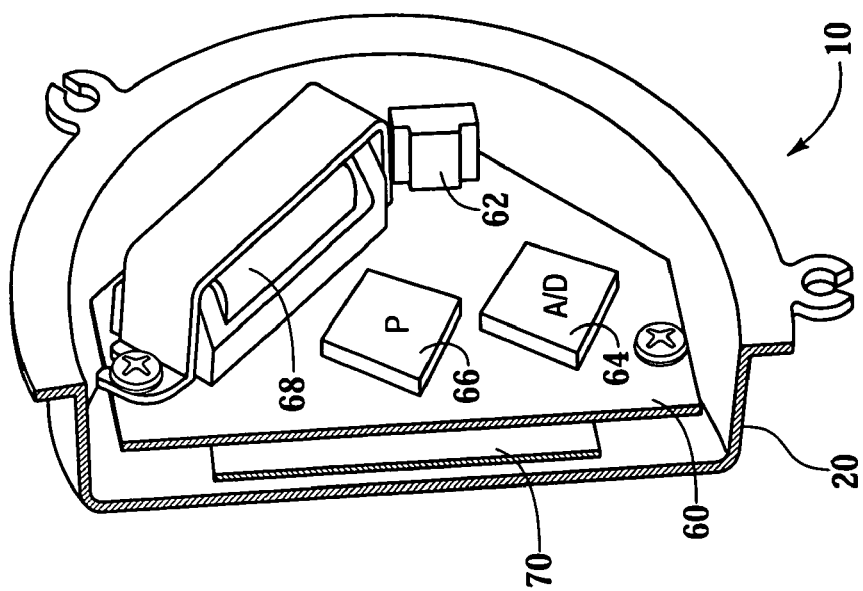
FIG. 2 shows a sectioned view of the pressure measurement device in FIG. 1.

FIG. 2 further illustrates pressure measurement device 10. As illustrated, pressure sensor 30, Bourdon tube 40, and movement 50 in FIG. 1 have been removed to show a printed circuit board (PCB) 60. PCB 60 is electrically coupled via a sensor connector 62 to pressure sensor 30 in FIG. 1. PCB 60 also includes an analog-to-digital (A/D) converter 64 to digitize the sensor output and a processor 66 to process the pressure data indicated via the sensor output. In some implementations, the output from the sensor is amplified prior to being digitized by A/D converter 64. Amplification, however, is not required for all implementations.

A/D converter 64 and processor 66 are operatively mounted and preferably soldered to PCB 60. Processor 66, which may, for example, be a microprocessor, receives the digital signal from A/D converter 64, the signal being representative of pressure at the inlet, and generates an output signal including pressure data corresponding to the digital signal, and, hence, the output of the sensor. Pressure data may, for example, include indications of sensed pressure.

In particular implementations, the processor output may include characterization data related to the pressure being measured at inlet 26 in the pressure data. Characterization data, for example, may include exception reporting or pressure set points. Table 1 demonstrates exception data.

TABLE 1

| Pressure Magnitude (P) | Characteristic |
| --- | --- |
| P << X | Pressure Dangerously Low |
| P < X | Pressure Low |
| X < P < Y | Pressure Nominal |
| P > Y | Pressure High |
| P >> Y | Pressure Dangerously High |

The processor output is coupled to a transmitter PCB 70, which is located between PCB 60 and housing 20. Transmitter PCB 70 includes a transmitter, which is one type of data communication device, for sending pressure data via a wireless signal to a remote location, separate from device 10. Acceptable forms of wireless signals include radio frequency (RF), infrared (IR), or any other appropriate electromagnetic regime. Furthermore, the data may be transmitted by amplitude modulation, frequency modulation, phase modulation, pulse modulation, or any other appropriate data communication technique. Transmitter PCB 70 may include its own processor to control wireless communication functions. In particular implementations, transmitter PCB 70 may also be able to wirelessly receive data from a remote source, possibly by the use of a transceiver, which is another type of data communication device. A transceiver may be used in conjunction with or in place of the transmitter.

For power, PCB 60 includes a battery 68. In particular implementations, battery 68 may facilitate long-term, maintenance-free operation by being a lithium battery or other long-lasting power source. Use of a long-lasting power source in combination with remote reporting provides substantial benefits in applications involving hazardous or hard-to-get-to locations. Note that battery 68 may be mounted in a variety of locations in housing 20.

Device 10 has a variety of features. For example, pressure data may be provided at the pressure device and remotely from the pressure device. Thus, field personnel may determine pressure data at the pressure device, and pressure data may also be sent to a remote location. This allows for convenient inspection and monitoring of pressure data. Furthermore, remote monitoring may be important for hazardous or hard-to-get-to locations. In certain implementations, device 100 may be CE approved for EMI/RFI compatibility, and may be suitable for Class 1, Div 1 hazardous locations use (i.e., intrinsically safe). Additionally, pressure measurement by two different transducers, allows for corroboration of pressure data and for redundancy in case one transducer fails. As a further example, the wireless transmission components may be incorporated into a standard form factor for a pressure measurement device, which may provide manufacturing efficiencies. Furthermore, it may provide commercial advantages, such as, for example, cost savings through inventory control.

FIGS. 3A–E illustrate a pressure measurement device 100. FIG. 3A shows a perspective view of device 100, and FIG. 3B shows a side, elevated view of device 100.

FIGS. 3C–D are end views of device 100, and FIG. 3E is a section taken along section line E—E of FIG. 3D. Device 100 may be CE approved for EMI/RFI compatibility, and may be suitable for Class 1, Div 1 hazardous locations use (i.e., intrinsically safe).

Device 100 includes a housing 110 having a first end 112 and a second end 114.

First end 112 includes an inlet 113 for pressure, and second end 114 includes a translucent window 119 to facilitate an IR link 160. In particular implementations, housing 110 is approximately five inches long and three inches in diameter; in other implementations, it may have any appropriate size.

At first end 112, a pressure fitting 115 is coupled (e.g., by welding) to an adapter flange 116. Flange 116 contains methodology for the support of interface electronics, to be discussed below. Flange 116 is then married to housing 110, which may be non-metallic, through a flat gasket 117, or "O" ring seal, and screws 118. In another implementation, a threaded flange mated to a threaded housing could be used.

Inlet 113 is in fluid communication with a pressure sensor 120 in housing 110. Pressure sensor 120 is mounted (e.g., by threading or welding) to pressure fitting 115 and outputs an electrical signal that is representative of the pressure being applied to the sensor via inlet 113 in pressure fitting 115. Thus, pressure sensor 120 converts pressure at inlet 113 to an electrical output, similar to pressure sensor 30 in FIG. 1.

Pressure sensor 120 is coupled to a host PCB 130. Coupled to host PCB 130 is a transmitter PCB 140. An infrared LED 150, which may be of any appropriate type, is located at second end 114 of housing 110 and is electrically coupled to transmitter PCB 140.

PCB 130 includes a processor 132 that processes signals representing pressure measurements. The processor, for instance, may generate a code corresponding to the pressure and/or include secondary pressure data, such as exception reporting. Predetermined exception conditions, such as, for example, "low pressure" and "high pressure", may be associated with predefined pulse codes. The processor may have programming to indicate the exception condition, such as, for example, setting or clearing a target. Pressure data (e.g., pressure readings and secondary data) may then be wirelessly transmitted via LED 150 through a series of pulses. Host PCB 130 also includes an extended-duration power source 134, such as a lithium battery.

In particular implementations, host PCB 130 accepts a low level or a higher level output (300 mV to approximately 2 V, for example) from pressure sensor 120, performs an analog-to-digital conversion on the signal, and then manipulates the digitized signal prior to having it transmitted via electromagnetic waves to a compatible receiver. The receiver may then pass the data to a remote transmitting unit (RTU) for upload to an established system or communicate the data directly to a computer or local system via serial communication. There may also be an option for a local indication of the pressure at device 100, in the form of a digital display, for example.

To emit pulses (e.g., a series of long and short flashes), transmitter PCB 140 includes a processor 142, which may be controlled by programming stored in memory. The programming may, for example, search a database, which may also be stored in memory, for a pulse sequence corresponding to a detected pressure. For instance, the programming could search a database for a code received from a microprocessor. The code would have an associated pulse sequence, and processor 142 would cause LED 150 to emit an infrared signal according to the pulse sequence. IR link 160 may then carry this pressure data to a conventional IR receiver for interpretation.

In particular implementations, transmitter PCB 140 may include an Infrared Data Association (IrDA) interface. The IrDA interface may allow data to be wirelessly communicated two ways between device 100 and an external, separate computer. The IrDA interface, for example, may locate pulse sequences associated with the pressure data from processor 132. Furthermore, an external computer may be used to program device 100 via link 160. The IrDA interface may be advantageous because it may be implemented without compromising the housing with a hole, which may be required for an external connector for another type of interface, such as, for example, an RS-232 interface. Furthermore, a programming device may communicate with the interface by being positioned in the vicinity of the receiving port, alleviating alignment issues. Note that an RF transceiver could be used for programming processor 132 in some implementations.

Figure 4D:
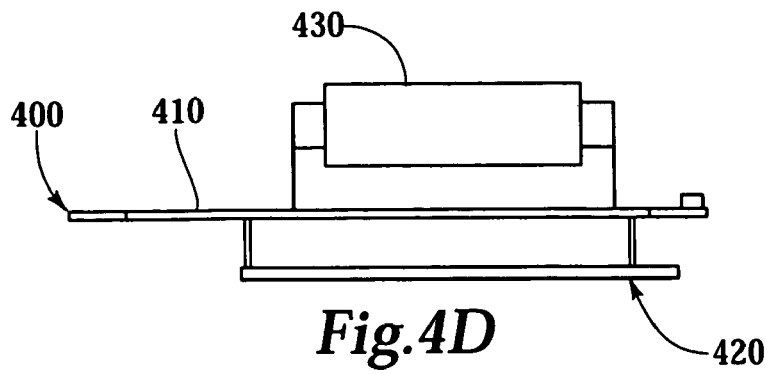
FIGS. 4A–D illustrate an example printed circuit board assembly.
Figure 4B:
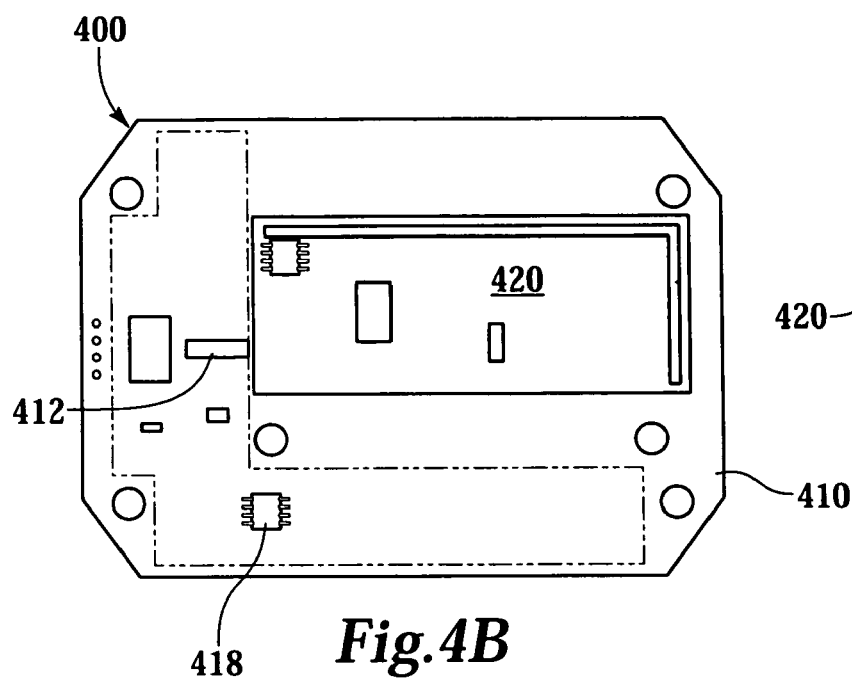
Figure 4C:
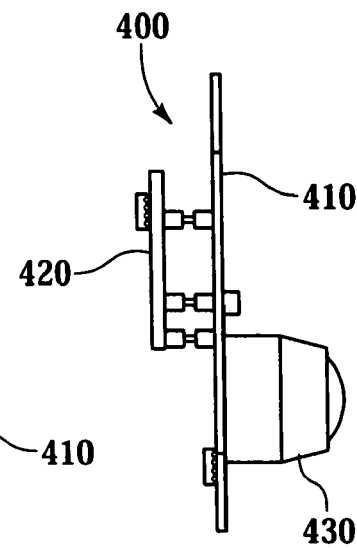
Figure 4A:
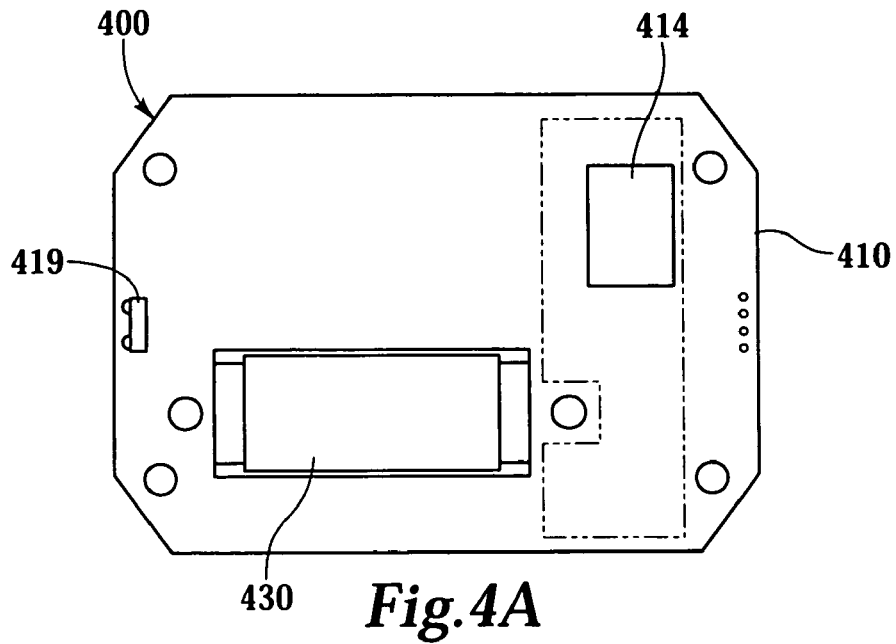

FIGS. 4A–4D illustrate an example PCB assembly 400. FIG. 4A is a front view of PCB assembly 400. FIG. 4B is a back view of PCB assembly 400. FIG. 4C is an end view of PCB assembly 400. FIG. 4D is a side view of PCB assembly 400. PCB assembly 400 may be used for the pressure measurement device in FIG. 1, the pressure measurement device in FIG. 3, or any other appropriate pressure measurement device.

PCB assembly 400 includes a host PCB 410 and a transmitter PCB 420. Assembly 400 is powered by a lithium power source 430 mounted on host PCB 410, which may last between six months to two years at a transmission frequency of once a minute. Therefore, maintenance-free operation in a hazardous environment may be achieved for extended durations. The assembly, and perhaps the entire pressure measurement device of which it is a part, therefore, may require no external power source.

Host PCB 410 includes an A/D converter 412 and a microprocessor 414. A/D converter 412 is operable to accept and digitize a signal from a pressure transducer. The signal may be filtered and protected from the influence of EMI/RFI interference. The operating characteristics of A/D converter 412, such as update rate and input selection, may be programmable through a serial interface. For example, A/D converter 412 may be adjusted via a serial interface from microprocessor 414, to accommodate varying output voltage levels from different types of pressure transducers, which may be excited from a constant voltage or constant current source.

Microprocessor 414 may have a variety of functions. For example, the microprocessor may read the raw, digitized pressure signal from the A/D converter 412 and also control A/D converter 412. Furthermore, microprocessor 414 may compensate the digitized signal to correct for non-linearity and temperature coefficients.

Microprocessor 414 may also control power to A/D converter 412, along with most, if not all, of the other electronic instruments of a pressure measurement device. Thus, microprocessor 414 may conserve power by putting PCB assembly 400, or possibly even the entire pressure measurement device of which it is a part, to sleep or in a low power mode, waking the components at programmable time intervals.

Microprocessor 414 may additionally control the frequency of wireless transmissions of pressure data based upon programmable pressure set points. For example, the device may transmit pressure data at a nominal frequency until such time as the sensed pressure exceeds or falls below programmable warning pressure points. At that time, the transmission frequencies may increase or decrease in frequency, according to the program. If the sensed pressure exceeds or falls below these warning levels, then an alarm condition may be reached in which the transmission frequencies may again increase or decrease. When the sensed pressure returns to nominal levels, the transmission frequencies may return to their previous settings. Table 2 illustrates an example transmission frequency scheme. More generally, the processor output may include any appropriate type of pressure-related data and/or any appropriate information about the pressure measurement device.

TABLE 2

| Pressure Magnitude (P) | Transmission Frequency (Hz) |
|---|---|
| P << X | 1.000 |
| P < X | 0.100 |
| X < P < Y | 0.017 |
| P > Y | 0.100 |
| P >> Y | 1.000 |

Microprocessor 414 may also monitor and communicate over a serial IrDA link. Furthermore microprocessor 414 may "data-log" pressure data to an onboard memory, which may, for example, include random access memory (RAM), electronically-erasable, programmable read-only memory (EEPROM), compact disk read-only memory (CD-ROM), and/or any other appropriate volatile or non-volatile information storage device.

Microprocessor 414 may further send pressure data to a digital display for local pressure indication. The pressure data may be sent in a serial fashion, and the display may operate in a low-power manner.

Control of various aspects of assembly 400, and, hence, a pressure measurement device of which the assembly is a part, may be maintained and programmed through an IR Data Association (IrDA) interface 419. IrDA interface 419 provides a two-way, serial communication link between microprocessor 414 and an external computer loaded with a software utility.

The external computer, possibly connected through an RS-232 link to an IrDA converter, may use this software utility to perform multiple functions. These functions may include polling a pressure measurement device for information, changing the transmitting frequency based upon sensed pressure, and/or COM port selection. There may also be warning ranges and alarm ranges, each with their own programmable transmit intervals, as well as a nominal transmission frequency, established. Warning ranges and alarm ranges are one example of exception reporting. Additionally, the functions may be able to establish pressure check, transmit, and IrDA wake-up rates. Furthermore, the utility may be able to perform diagnostics of the components. The functions may be built on top of and/or in conjunction with the functionality available in IrDA interface 419.

IrDA interface 419, possibly through the software utility, may also be used to control the scaling and calibration of the device of which assembly 400 is a part. For example, a full-scale pressure value may be entered, and with zero pressure introduced to the pressure sensor, a zero button on a utility screen is clicked. This action causes the readings to be normalized to zero, and microprocessor 414 to respond that the unit has been zeroed. The pressure sensor is then introduced to full-scale pressure, and a full-scale button on a utility screen is clicked. The full-scale values are displayed, and the microprocessor responds that the unit has been calibrated at full scale.

A/D converter 412 may be set up through IrDA interface 419, as well. Through the interface, a user may program which inputs of the A/D converter are to be used, the internal gain required depending upon the sensor technology used, the conversion time of the converter, and/or other technical aspects of A/D converter operation. Furthermore, scaling factors for pressure data may be set, as well as engineering units for the pressure reading selected.

Transmitter PCB 420 includes any appropriate components for wirelessly sending and/or receiving information. A suitable transmitter PCB may be obtained from AXONN Corp. of New Orleans, La.

Figure 5:
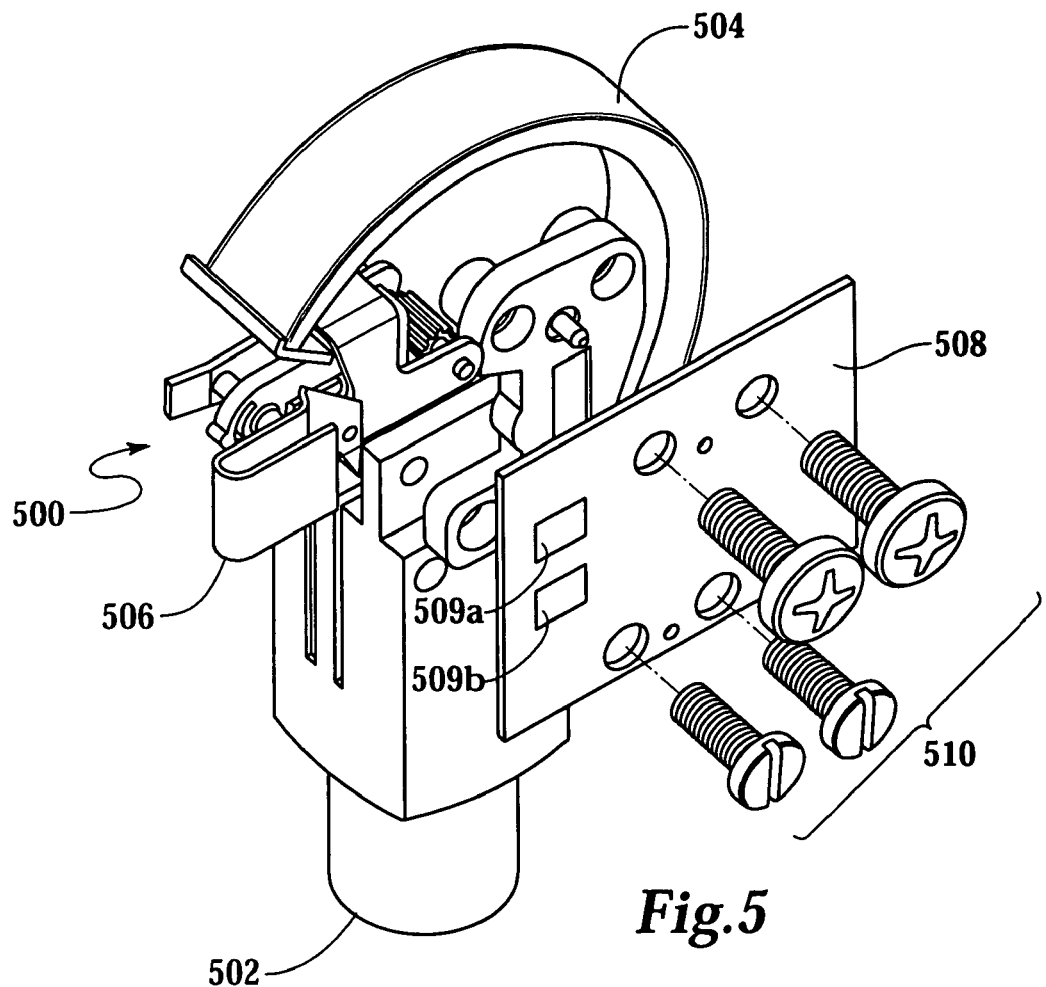
FIG. 5 shows a perspective view of an example pressure measurement device.

FIG. 5 illustrates an example pressure measurement device 500. Device 500 is similar to device 10 in FIG. 1. Rather than using a piezosensor to generate an electrical output, however, device 500 uses motion-responsive current generating/sensing technology. An example of such is eddy current sensing. Suitable eddy current sensing structure is available from LZT Technology of San Bernadino, Calif.

As illustrated, pressure measurement device 500 includes a Bourdon tube 504 that is responsive to pressure changes at an inlet 502. An inductive target 506 is coupled to Bourdon tube 502, possibly through a movement, such that displacement of Bourdon tube 504 causes target 506 to translate proportionally to the pressure changes sensed at inlet 502. As shown, target 506 is a U-shaped, metallic stamping that is sized to wrap around the edge of a PCB 508. Target 506, however, may have any other appropriate configuration. PCB 508 is supported in a fixed position relative to the housing for the pressure measurement device by screws 510 and includes a pair of inductive coils 509, along with other traces. The motion of target 506 relative to the inductive coils affects the inductive balance in the circuit. Thus, pressure changes at inlet 502 are converted to an electrical output. In certain implementations, the output may be between 4–20 mA. As with device 10, the electrical output may then be processed and wirelessly transmitted to a remote location.

Device 500 has a variety of features. For example, the device provides an efficient structure for converting pressure to electrical output that can be communicated to a remote location. Furthermore, the structure may be readily implemented in a standard pressure gauge, reducing manufacturing costs and possibly allow retrofitting. Furthermore, device 500 may be CE approved for EMI/RFI compatibility, and may be suitable for Class 1, Div 1 hazardous locations use (i.e., intrinsically safe).

Figure 6A:
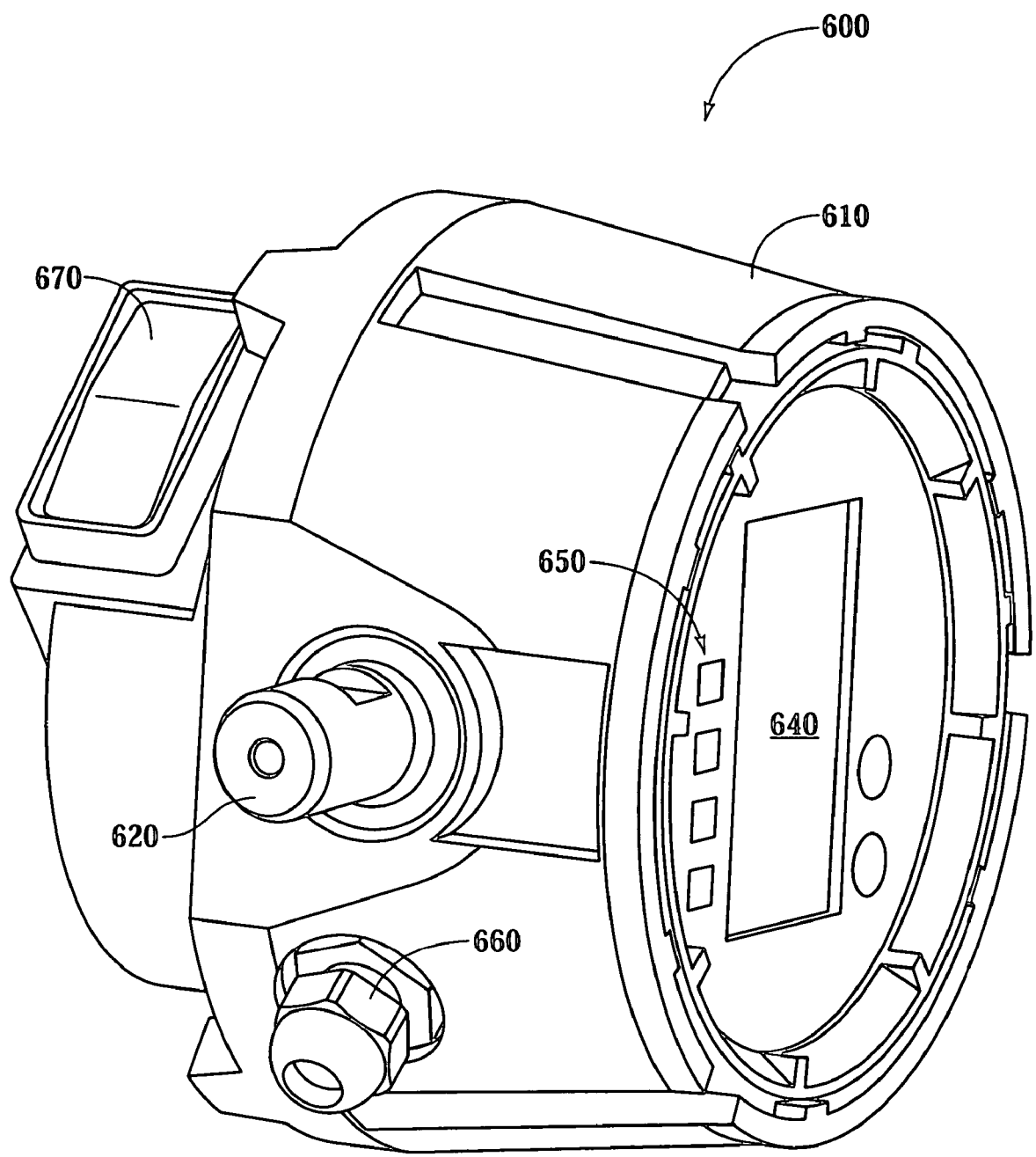
FIGS. 6A–B show perspective views of an example pressure measurement device.
Figure 6B:
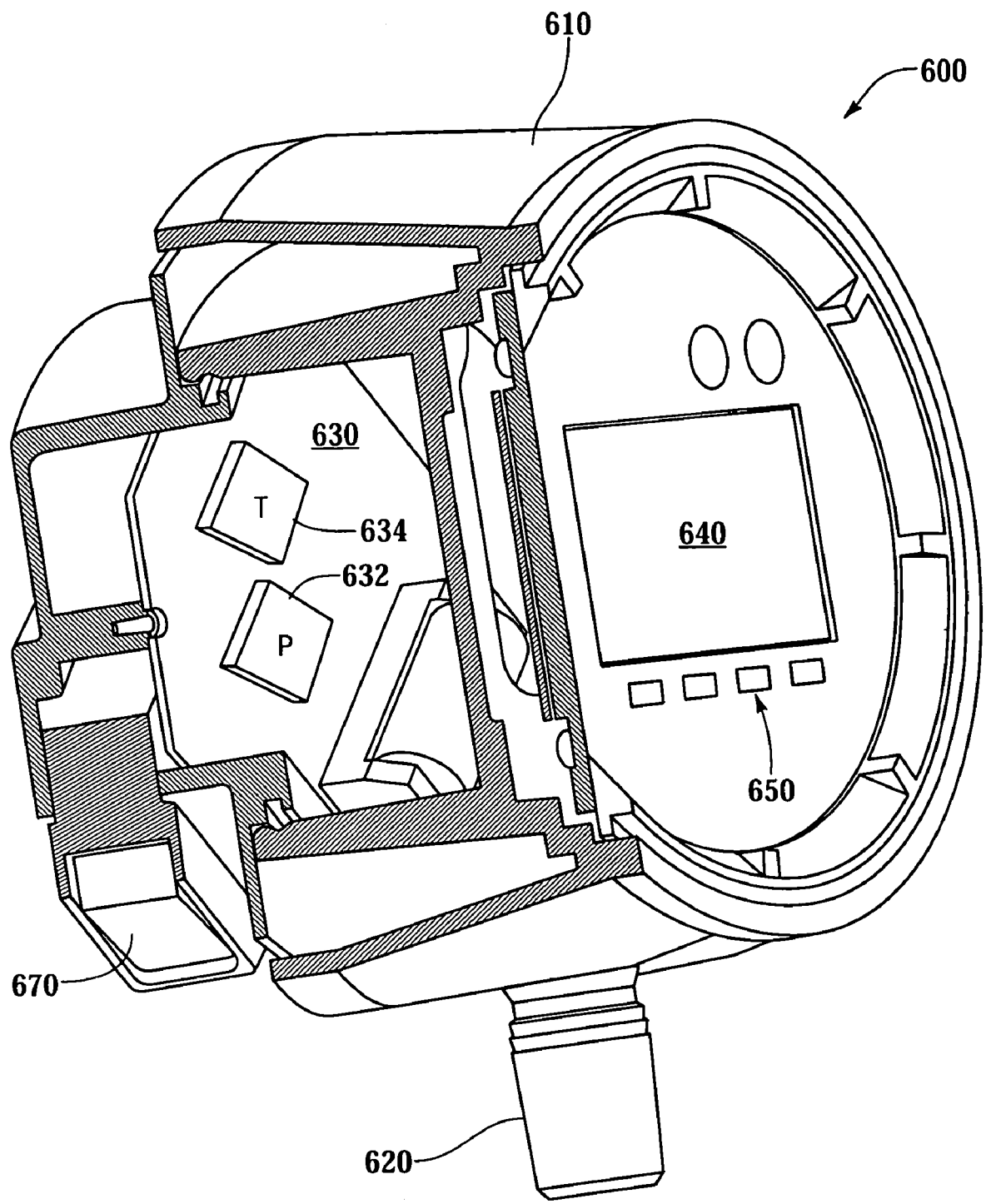

FIGS. 6A–B illustrate an example pressure measurement device 600. As illustrated, pressure measurement device 600 is a digital pressure gauge. FIG. 6A shows a perspective view of pressure measurement device 600, and FIG. 6B shows a sectioned view of device 600.

Device 600 includes a housing 610 that supports a pressure connection 620, which allows the pressure to be measured to be introduced to the device. Device 600 also includes a PCB 630 that includes a processor 632 for processing a signal representing the pressure introduced at connection 620 and a transceiver 634 for generating a wireless transmission corresponding to the signal. That is, transceiver 634 may generate a wireless transmission representing the pressure introduced at connection 620, along with other pressure-related data. PCB 630 may be similar to PCB assembly 400 in FIG. 4, and the signal may be formed by a piezosensor.

Device 600 additionally includes a display 640 for presenting pressure-related data for the device. Display 600 may also present device status information (e.g., on/off, transmitting/receiving, etc.). Display 640 may, for example, be a liquid crystal display (LCD).

Device 600 further includes components that allow interaction with processor 632. Located near display 640 are a plurality of function keys 650. Using function keys 650, a user may interrogate processor 632 for additional pressure-related data, such as pressure set points or exception reporting, device status, or any other appropriate information. In some implementations, a user may even program processor 632 using keys 650. Information regarding these interactions may be presented on display 640. Keys 650 may also be used to turn display on and off. This allows power to be conserved when a user is not observing device 600. In other implementations, keys 650 may be buttons, dials, a touchpad, or any other appropriate user input device. Device 600 may be safe for hazardous Class 1, Div. 1 locations, such as, for example, upstream gas well head applications.

Device 600 also includes an electrical coupling 660, which may, for example, be a Heyco fitting. Through electrical coupling 660, processor 632 may accept discrete status input and/or output pulse accumulation information. For instance, discrete status inputs may be contact closure inputs that detect switch closures from an outside source, such as, for example, magnetic-type switch contact closures signaling the presence of a "Plunger Event" in a gas well head. As another example, the coupling and processor may count pulses received from an outside source, such as, for example, a gas meter. Additionally, other information may be input to processor 632 for wireless transmission by transceiver 634. For instance, information from another measurement device (e.g., a temperature measurement device such as a resistive temperature device or a thermocouple) may be input and transmitted. These measurements may also be intrinsically safe.

Device 600 further includes a switch 670. Switch 670 controls the power status of transceiver 634. Thus, device 600 may be prevented from wirelessly transmitting information. Switch 670 may be useful when a user is programming processor 632 using function keys 650. In other implementations, switch 670 may be a button, a dial, or any other appropriate user input device.

Note that switch 670 and function keys 650 allow the on/off functionality of the components that provide the local and wireless pressure data to be independently controlled. Thus, device 600 may provide pressure data locally, remotely, or locally and remotely. In other implementations, however, the independent control may be achieved through one input component or input component type.

In particular implementations, device 600 may include less, more, and/or a different arrangement of components. For example, device 600 may include a dedicated visual indicator (e.g., an LED) and/or an audible indicator (e.g., a speaker) to present the status of the device. As another example, device 600 may include an IrDA interface for programming processor 632. As a further example, device 600 may not include display 640, buttons 650, electrical coupling 660, and/or switch 670. Device 600 may be CE approved for EMI/RFI compatibility, and may be suitable for Class 1, Div 1 hazardous locations use (i.e., intrinsically safe).

Figure 7:
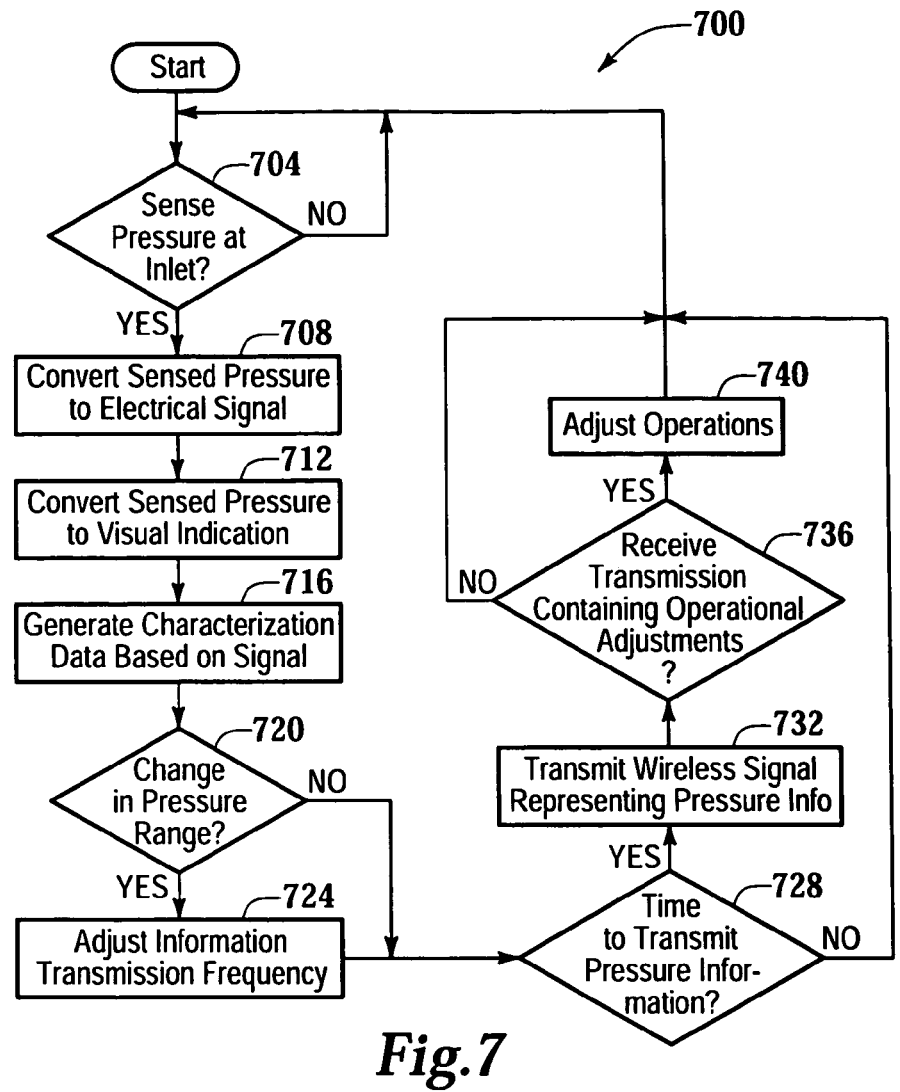
FIG. 7 illustrates a process at a pressure measurement device.

FIG. 7 illustrates a process 700 at a pressure measurement device. Process 700 may be implemented by a pressure measurement device similar to pressure measurement device 10 in FIG. 1, pressure measurement device 100 in FIG. 3, pressure measurement device 500 in FIG. 5, pressure measurement device 600 in FIG. 6, or any other appropriate pressure measurement device.

The process begins with waiting to sense pressure at an inlet (decision block 704). Once pressure is sensed, the process continues with converting the sensed pressure to an electrical signal (function block 708). The pressure may, for example, be converted to an electrical signal by a piezo-resistive device. The process also calls for converting the sensed pressure to a visual indication (function block 712). This conversion may, for example, be performed by: 1) a Bourdon tube with a rotatably coupled pointer; 2) determining a value of the electrical signal, associating a symbol with the value, and displaying the symbol; or 3) any other appropriate technique. The visual indication may be displayed at the pressure measurement device.

The process continues with generating characterization data based on the electrical signal at function block 716. The characterization data may, for example, be generated by comparing an attribute of the signal to a table of signal attributes and determining a characteristic associated with that attribute. Table 1 provides such an example.

The process continues with determining whether a change in pressure range has occurred (decision block 720). This determination may, for example, be made by comparing the magnitude of the signal to certain set points. The first column of Table 1 provides an example of pressure set points. If the pressure has changed ranges, the process calls for adjusting the pressure data transmission frequency (function block 724). For example, if the pressure has changed from a nominal level to one that is high, the transmission frequency may be adjusted from once every minute to once every ten seconds. Furthermore, if the pressure has reached a very high level, the transmission frequency may be adjust to once every second. Other pressure ranges and transmission frequencies may also be used.

After adjusting the transmission frequency, or if there has been no change in pressure range, the process continues with determining whether it is time to transmit pressure data (decision block 728). The transmission time is determined in part by the transmission frequency. If it is not time to transmit, the process calls for returning to check for additional pressure sensings (decision block 704).

If, however, it is time to transmit pressure data, the process calls for transmitting a wireless signal representing pressure data (function block 732). The wireless signal may be transmitted in the IR or other electromagnetic regime, and the data may be sent by pulse modulation or other appropriate technique. The data may include a representation of the magnitude of the electrical signal, the characterization data, the new transmission frequency, or any other appropriate pressure-related information.

The process also calls for determining whether a transmission containing operational adjustments has been received at decision block 736. The adjustments may, for example, regard pressure set points, transmission frequencies, and/or any other appropriate operating parameter. If such a transmission has been received, the process calls for adjusting the operations at function block 740. Adjusting the operations may, for example, include altering instructions for a processor or data in a table. After adjusting operations, or if such a transmission has not been received, the process calls for returning to check for additional pressure sensings (decision block 704).

Although FIG. 7 illustrates a process at a pressure measurement device, other processes at a pressure measurement device may contain less, more, and/or a different arrangement of operations. For example, certain processes may not call for converting the sensed pressure to a visual indication, generating characterization data, adjusting the transmission frequency, and/or receiving an operational adjustment transmission. As another example, a process may call for storing pressure data until it is time to transmit. As a further example, generating characterization data may occur at any point after the formation of the electrical signal but before the transmission of the wireless signal. As an additional example, determining whether an operational adjustment transmission has been received may be accomplished at any point. As another example, a process may call for providing a visual indication of operating mode. This may, for example, be accomplished using an LED indicator having two LEDs, where one LED indicates on/off and the other indicates transmitting/receiving. As a further example, a process may call for entering into a power conservation mode. As an additional example, a process may include receiving externally generated data and transmitting the data as part of the wireless signal.

Figure 8:
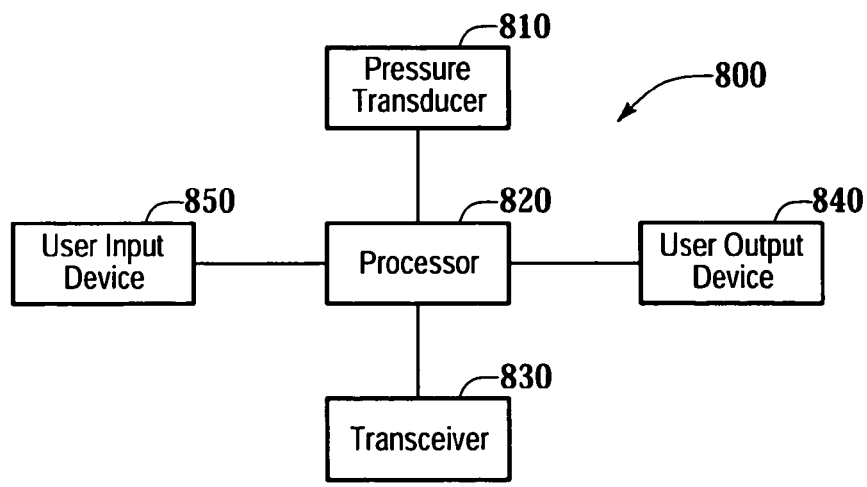
FIG. 8 is a block diagram of components for an example pressure measurement device.

FIG. 8 illustrates components 800 for an example pressure measurement device. Components 800 include a pressure transducer 810, a processor 820, and a transceiver 830. Pressure transducer 810 is operable to sense pressure and to generate an electrical signal representative of the pressure. Pressure transducer 810 may, for example, be a piezosensor. Processor 820 is operable to receive the signal, analyze it, and generate a signal representative of the pressure transducer signal. Processor 820 may, for example, accomplish this by determining a set of pulses that represent the pressure transducer signal. Processor 820 may also determine other pressure-related data, such as exception reports. For performing its operations, processor 820 may have instructions encoded therein and/or stored in memory associated therewith. Transceiver 830 is responsible for wireless transmitting the processor signal. The transmission may represent the pressure sensed by the pressure transducer, as well as other pressure-related data.

Components 800 also include user interface devices—a user output device 840 and a user input device 850. User output device 840 is operable to present information, whether about pressure, the device, or otherwise, to a user at the pressure measurement device. The information may be presented in visual, audible, tactile, or other appropriate format. User input device 850 is operable to detect commands from a user at the device. User input device 850 could include a button, a keypad, a touch screen, a stylus, a microphone, and/or any other appropriate device. Processor 820 is typically responsible for responding to the commands.

Although FIG. 8 illustrates the components for a pressure measurement device, other pressure measurement devices may include less, more, and/or a different arrangement of components. For example, a pressure measurement device may not include a user input device and/or a user output device. As another example, a pressure measurement device may include an A/D converter between pressure transducer 810 and processor 820 and/or a memory coupled to processor 820.

Figure 9:
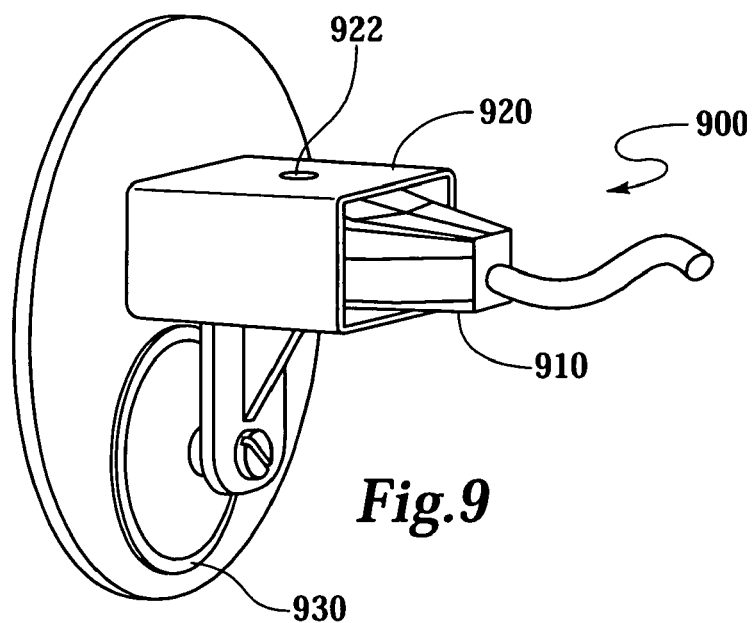
FIG. 9 illustrates a system for programming a pressure measurement device.

FIG. 9 illustrates a system 900 for programming a pressure measurement device. To program a pressure measurement device, system 900 uses IR signals. System 900 may be especially useful for programming a pressure gauge.

System 900 includes an IrDA adapter 910 and a holder 920 for the adapter. Adapter 910 and holder 920 include apertures, IR-transmissive windows, and/or other constructs through which IR signals may be emitted. Holder 920 also includes an aperture 922 through which an LED status light of adapter 910 may shine when transmitting, in order that the status of the adapter may be determined by a user. Adapter 920 may be any appropriate IrDA adapter and, in particular embodiments, may be an IrDA serial COM port manufactured by ActiSys of California. Holder 920 may, for example, be molded of a suitable plastic, such as, for example, polycarbonate.

System 900 also includes a vacuum cup 930 assembly with integral stud/nut mounting. Assembly 930 may be of a type offered by Adams Manufacturing of Pennsylvania.

In operation, a user assembles holder 920 with vacuum cup assembly 930 and inserts adapter 910 into holder 920. Holder 920 may include a device for capturing adapter 910. The capturing device may, for example, be a piece of Velcro tape within the opening to further secure item adapter 910 when it is inserted fully into holder 920. The user positions the transmission construct of holder 920 near the receiving construct of the pressure measurement device. In particular implementations, the receiving construct may be a pass-through hole in a dial plate, and the positioning is accomplished by pressing assembly 930 to the housing window, which may be a transparent window that is standard issue on pressure gauges. Assembly 930 may be coupled to the housing on a temporary basis (e.g., for as long as it takes to configure the transmitter), as the user would normally break the vacuum grip of assembly 930 and store the assembly for future reuse.

Once in place, IR pulses are emitted through the transmissive constructs of adapter 910 and assembly 920 to the receptive construct of the housing. The signals, possibly after passing through in-line holes in the housing mid-partition, reach the IrDA transceiver, which may be located on the front side of host PCB 60 in FIG. 2.

The pressure measurement devices discussed may be particularly useful for a variety of different applications. For example, they may be useful in well heads. As another example, they may be useful in hazardous environments or places that are difficult to access.

While particular implementations and applications have been illustrated and described, it is to be understood that the invention is not limited to the precise construction and compositions disclosed herein and that various additions, deletions, substitutions, and/or modifications may be apparent from the foregoing descriptions without departing from the spirit and scope of the invention as defined in the appended claims.

What is claimed is:

1. A device for measuring pressure, the device comprising:
   a housing comprising an inlet;
   a transducer coupled to the inlet in the housing to generate an electrical signal representative of pressure at the inlet, the transducer comprising:
      a pressure-to-mechanical transducer coupled to the inlet to displace in response to pressure at the inlet,
      a first component of an eddy current sensor, the first component coupled to the pressure-to-mechanical transducer, the first component being movable in response to displacement of the pressure-to-mechanical transducer, and
      a second component of an eddy current sensor, the second component positioned to sense movement of the first component and, in response to movement of the first component, generate the electrical signal; and
   a data communication device coupled to the transducer in the housing to transmit a wireless signal corresponding to the electrical signal, whereby pressure information is provided remotely.

2. The device of claim 1, wherein:
   the housing comprises a stem extending to the inlet;
   the pressure-to-mechanical transducer comprises a Bourdon tube coupled to the inlet to arcuately displace in response to pressure at the inlet; and
   the device further comprises a visual indicator coupled to the inlet in the housing to indicate pressure at the inlet, the visual indicator comprising:
      a shaft coupled to the Bourdon tube to rotate in response to displacement of the Bourdon tube, and
      a pointer attached to the rotatable shaft to indicate pressure values.

3. The device of claim 2, wherein
   the first component comprises an inductive target coupled to the Bourdon tube, the target being movable in response to displacement of the Bourdon tube; and
   the second component comprises an inductive coil positioned to sense movement of the inductive target and, in response to movement of the inductive target, generate the electrical signal.

4. The device of claim 1, further comprising a visual indicator coupled to the inlet in the housing to indicate pressure at the inlet, whereby pressure information is provided both locally and remotely.

5. The device of claim 1, wherein the data communication device comprises an infrared emitter.

6. The device of claim 1, further comprising a processor coupled to the transducer and the data communication device.

7. The device of claim 6, wherein the processor is operable to generate pressure characterization data based on the signal representing pressure at the inlet, wherein the characterization data is transmitted as part of the wireless signal.

8. The device of claim 7, wherein characterization data comprises warnings based on the pressure at the inlet.

9. The device of claim 6, wherein the processor is operable to control the frequency at which pressure information is transmitted.

10. The device of claim 9, wherein the processor is operable to control the pressure information transmission frequency based on pressure data set points, the frequency being altered in response to the pressure crossing a pressure data set point.

11. The device of claim 6, wherein the processor is operable to place itself and other electronic components into a power conservation mode.

12. The device of claim 6, wherein the processor is operable to compensate for non-linearity of the sensed pressure.

13. The device of claim 6, wherein the processor is operable to compensate for temperature coefficients.

14. The device of claim 6, further comprising an Infrared Data Association interface coupled to the processor, wherein the processor may be remotely programmed via the interface.

15. The device of claim 14, wherein the processor may be programmed to change pressure data set points.

16. The device of claim 6, further comprising externally accessible terminals coupled to the processor.

17. The device of claim 16, wherein the processor is operable to accept a discrete status input via the terminals.

18. The device of claim 16, wherein the processor is operable to output pulse accumulation information via the terminals.

19. The device of claim 1, further comprising a visual indicator at the housing to indicate mode of operation.

20. The device of claim 1, further comprising a data communication device on-off switch.

21. A device for measuring pressure, the device comprising:
   a housing comprising an inlet;
   a transducer coupled to the inlet in the housing to generate an electrical signal representative of pressure at the inlet, the transducer comprising:

a pressure-to-mechanical transducer coupled to the inlet to displace in response to pressure at the inlet, a first component of an eddy current sensor, the first component coupled to the pressure-to-mechanical transducer, the first component being moveable in response to displacement of the pressure-to-mechanical transducer, and a second component of an eddy current sensor, the second component positioned to sense movement of the first component and, in response to movement of the first component, generate the electrical signal;

a processor coupled to the transducer in the housing, the processor operable to receive the electrical signal and to generate a signal including pressure information corresponding to the signal; and a data communication device coupled to the processor in the housing to transmit a wireless signal representative of the processor generated signal, whereby pressure information is provided remotely.

22. The device of claim 21, further comprising a visual indicator coupled to the inlet in the housing to indicate pressure at the inlet.

23. The device of claim 21, wherein:
the pressure-to-mechanical transducer comprises a Bourdon tube coupled to the inlet to arcuately displace in response to pressure at the inlet;
the first component comprises an inductive target coupled to the Bourdon tube, the inductive target being moveable in response to displacement of the Bourdon tube; and
the second component comprises an inductive coil positioned to sense movement of the inductive target and, in response to movement of the inductive target, generate the electrical signal.

24. The device of claim 21, wherein the processor is further operable to generate pressure characterization data based on the electrical signal, wherein the characterization data is transmitted as part of the wireless signal.

25. The device of claim 21, wherein the processor is further operable to control the frequency at which pressure information is transmitted.

26. The device of claim 21, wherein the processor is further operable to place itself and other electronic components into a power conservation mode.

27. The device of claim 21, wherein the processor is further operable to compensate for non-linearity of the sensed pressure.

28. The device of claim 21, wherein the processor is further operable to compensate for temperature coefficients.

29. The device of claim 21, further comprising an Infrared Data Access interface coupled to the processor, wherein the processor may be remotely programmed via the interface.

30. The device of claim 21, further comprising externally accessible terminals coupled to the processor.

31. A device for measuring pressure, the device comprising:
a housing comprising an inlet;
a Bourdon tube coupled to the inlet in the housing to displace in response to pressure at the inlet;
an inductive target coupled to the Bourdon tube to move in response to displacement of the Bourdon tube;
an inductive coil positioned to sense movement of the inductive target and, in response to movement of the inductive target, to generate an electrical signal representative of pressure at the inlet; and a data communication device coupled to the inductive coil in the housing to transmit a wireless signal corresponding to the electrical signal, whereby pressure information is provided remotely.

32. The device of claim 31, further comprising a processor coupled to the inductive coil and the data communication device.

33. The device of claim 32, wherein the processor is operable to generate pressure characterization data based on the electrical signal, wherein the characterization data is transmitted as part of the wireless signal.

34. The device of claim 32, wherein the processor is operable to control the frequency at which pressure information is transmitted.

35. The device of claim 34, wherein the processor is operable to control the pressure information transmission frequency based on pressure data set points, the frequency being altered in response to the pressure crossing a pressure data set point.

36. The device of claim 32, wherein the processor is operable to place itself and other electronic components into a power conservation mode.

37. The device of claim 32, wherein the processor is operable to compensate for non-linearity of the sensed pressure.

38. The device of claim 32, wherein the processor is operable to compensate for temperature coefficients.

39. The device of claim 32, further comprising an Infrared Data Access interface coupled to the processor, wherein the processor may be remotely programmed via the interface.

40. A method performed at a pressure measurement device, the method comprising:
sensing pressure at an inlet of a housing;
converting the sensed pressure to a mechanical displacement;
translating the mechanical displacement to a first component of an eddy current sensor;
sensing movement of the first component with a second component of an eddy current sensor;
converting the sensed movement to an electrical signal; and
sending a wireless signal corresponding to the electrical signal from the housing, whereby pressure information is provided remotely.

41. The method of claim 40, further comprising converting the sensed pressure to a visual indication of pressure, whereby pressure information is provided both locally and remotely.

42. The method of claim 41, wherein:
translating the mechanical displacement to a first component of an eddy current sensor comprises translating the mechanical displacement to an inductive target; and
sensing movement of the first component with a second component of the eddy current sensor comprises sensing movement of the target with an inductive coil.

43. The method of claim 40, wherein sending a wireless signal comprises emitting infrared radiation pulses.

44. The method of claim 40, further comprising:
generating characterization data for the sensed pressure based on the electrical signal; and
sending the characterization data as part of the wireless signal.

45. The method of claim 40, further comprising controlling the frequency at which pressure information is sent.

46. The method of claim 40, further comprising placing electronic components into a power conservation mode.

47. The method of claim 40, further comprising:
receiving wireless signals that specify operational adjustments; and
adjusting pressure measurement device operations.

48. The method of claim 40, further comprising:
receiving externally generated data; and
sending the data as part of the wireless signal.

49. The method of claim 40, further comprising providing a visual indication of operating mode at the housing.

50. A device for measuring pressure, the device comprising:
means for sensing pressure at an inlet of a housing;
means for converting the sensed pressure to an electrical signal at the housing by converting the sensed pressure to a mechanical displacement at the housing, translating the mechanical displacement to a first component of an eddy current sensor, sensing movement of the first component with a second component of the eddy current sensor, and converting the sensed movement to an electrical signal at the housing; and
means for sending a wireless signal corresponding to the electrical signal from the housing, whereby pressure information is provided remotely.

51. The device of claim 50, further comprising means for converting the sensed pressure to a visual indication of pressure, whereby pressure information is provided both locally and remotely.

52. The device of claim 50, wherein:
translating the mechanical displacement to a first component of an eddy current sensor comprises translating the mechanical displacement to an inductive target; and
sensing movement of the first component with a second component of the eddy current sensor comprises sensing movement of the target with an inductive coil.

53. The device of claim 50, wherein sending the wireless signal comprises emitting infrared radiation pulses.

54. The device of claim 50, further comprising means for generating characterization data for the sensed pressure based on the electrical signal, wherein the characterization data is sent as part of the wireless signal.

55. The device of claim 50, further comprising means for controlling the frequency at which pressure information is sent.

56. The device of claim 50, further comprising means for adjusting operations in response to received wireless signals.

57. The device of claim 50, further comprising means for receiving externally generated data, wherein the data may be sent as part of the wireless signal.

58. The device of claim 50, further comprising means for providing a visual indication of operating mode at the housing.

59. A device for measuring pressure, the device comprising:
a housing comprising a stem having an inlet;
a Bourdon tube coupled to the inlet to arcuately displace in response to pressure at the inlet;
a shaft mechanically coupled to the Bourdon tube to rotate in response to displacement of the Bourdon tube;
a pointer attached to the shaft to indicate pressure values;
an inductive target coupled to the Bourdon tube, the target being movable in response to displacement of the Bourdon tube;
an inductive coil positioned to sense movement of the inductive target and, in response to movement of the inductive target, generate an electrical signal;
an analog-to-digital converter coupled to the sensor, the converter operable to receive the electrical signal and produce a digitized version of the signal;
a microprocessor coupled to the converter, the microprocessor operable to:
receive the digitized signal,
compensate for non-linearity of the sensed pressure,
compensate for temperature coefficients,
generate pressure characterization data based on the compensated signal,
determine whether the frequency at which pressure information is transmitted should be adjusted,
if the frequency should be adjusted, adjust the frequency,
determine whether it is time to transmit pressure information,
if it is time to transmit pressure information, generate a signal comprising pressure information,
place itself and other electronic components into a power conservation mode,
an Infrared Data Association interface coupled to the microprocessor, wherein the microprocessor may be remotely programmed via the interface; and
an infrared transceiver coupled to the microprocessor to transmit a wireless signal representative of the microprocessor signal, whereby pressure information is provided both locally and remotely.

\* \* \* \* \*